No. 788,483. Patented April 25, 1905.

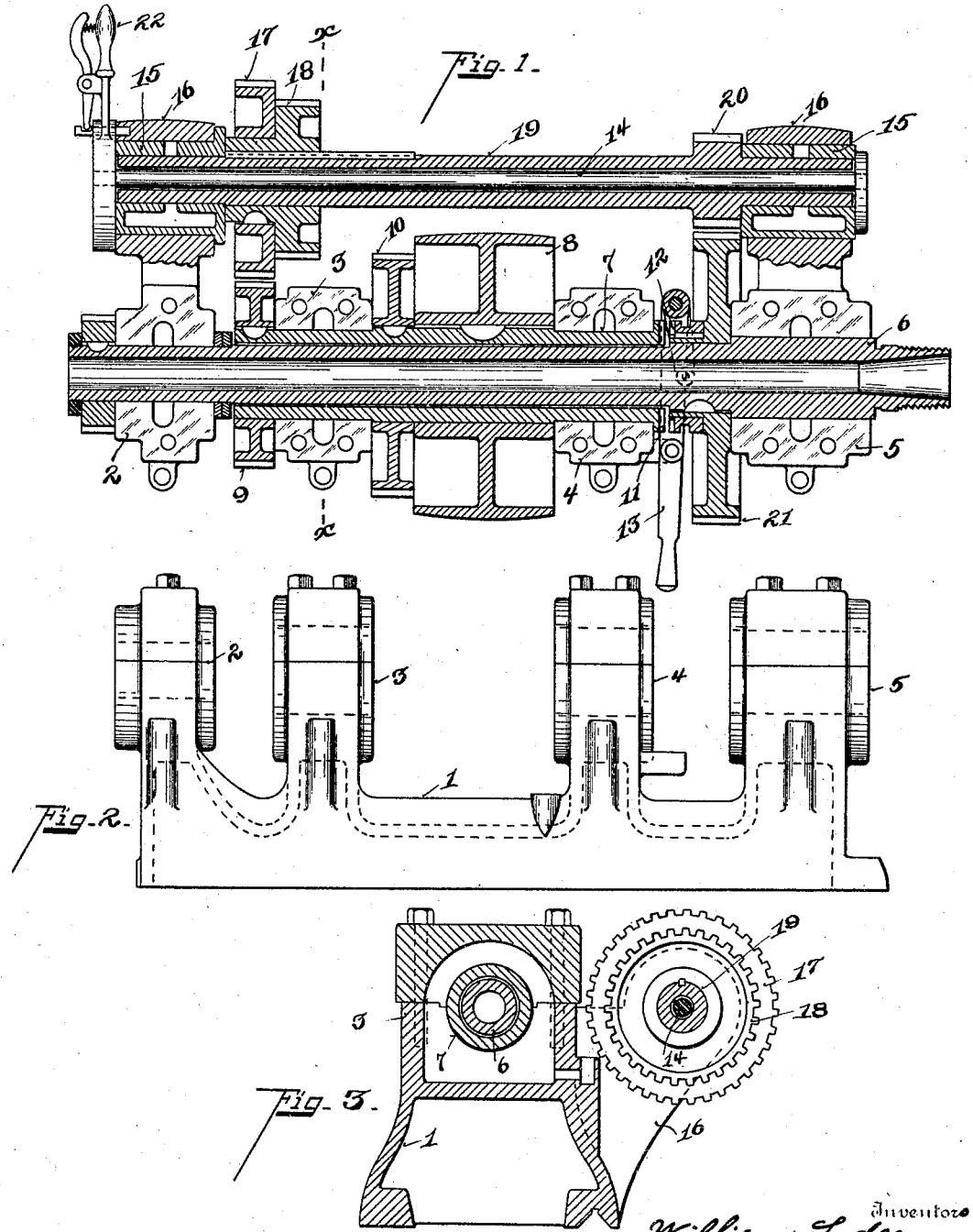

UNITED STATES PATENT OFFICE.

WILLIAM LODGE AND NICHOLAS D. CHARD, OF CINCINNATI, OHIO, ASSIGNORS TO THE LODGE & SHIPLEY MACHINE TOOL COMPANY, OF CINCINNATI, OHIO, A CORPORATION.

HEAD-STOCK FOR ENGINE-LATHES.

SPECIFICATION forming part of Letters Patent No. 788,483, dated April 25, 1905.

Application filed May 11, 1904. Serial No. 207,365.

*To all whom it may concern:*

Be it known that we, WILLIAM LODGE and NICHOLAS D. CHARD, citizens of the United States, residing at Cincinnati, in the county of Hamilton and State of Ohio, have invented certain new and useful Improvements in Head-Stocks for Engine-Lathes, of which the following is a specification.

Our invention relates to an improvement in the head-stock, spindle, and driving-pulley of an engine-lathe.

The features of our invention are more fully set forth in the description of the accompanying drawings, forming a part of this specification, in which—

Figure 1 is a horizontal section through the head-stock. Fig. 2 is a front elevation of the head-stock. Fig. 3 is a section on line $x\,x$, Fig. 1.

In the conventional type of lathe, in which the cone-pulley has a bearing upon the spindle, there are two serious defects. First, the entire upward pull or strain of the belt on the cone-pulley is transmitted to the bearings in which the spindle or live-center is journaled, thus having a constant tendency to destroy the accuracy of the live-center; second, when the ordinary back gearing is in use, the cone-pulley revolves directly on the spindle at a relatively higher speed, which results in great friction and wear on the spindle. These defects have been greatly augmented since the high-speed steel has come into use in which the cone-pulley is driven at a considerably higher speed. For instance, in the conventional lathe-head it frequently happens that the driving-pulley on the spindle is revolving at an excessive speed—say at two thousand revolutions per minute—while the spindle is revolving, say, at one hundred revolutions per minute, or sometimes the ratio is as high as sixty to one. This enormous friction on the internal bore of the driving-pulley and the external periphery of the spindle is very destructive to both, and it is impossible to keep the contacting bearing-surfaces of the pulley and spindle properly oiled without frequently stopping the machine. These defects are entirely obviated in this improvement.

1 represents the head-stock provided with the four concentric bearings 2 3 4 5.

6 represents the spindle, which is independently journaled in the two outside bearings 2 5.

7 represents a sleeve the internal diameter of which is greater than the external diameter of the spindle. This sleeve is journaled in the two intermediate bearings 3 4 concentrically with the spindle, but supported free from frictional contact therewith.

8 represents a broad-faced driving-belt pulley keyed upon the sleeve 7 between the bearings 3 4.

9 10 represent gear-wheels keyed upon the sleeve 7 upon opposite sides of the bearing 3.

The front end of the sleeve 7 is provided with a clutch member 11. The spindle is provided with a coöperating clutch member 12. 13 represents a lever, fulcrumed on the head-stock and connected to the clutch member 12, which latter is fixed to turn with and slide on the sleeve of gear-wheel 21, fixed to the spindle. It is obvious that when these clutches are engaged the spindle will be directly driven by the driving-pulley, but free from both belt strain and friction.

16 represents brackets in which are eccentric bearing-sleeves 15.

19 represents a sleeve-shaft journaled in sleeves 15.

14 represents a rod through the sleeve 19 for connecting sleeves 15.

17 18 represent different-diameter gear-wheels which are fixed to turn with and slide on the sleeve 19, so as to be intermeshed gear 17 with the gear-wheel 9 or gear-wheel 18 with gear-wheel 10. Sleeve 19 is provided with a pinion 20, adapted to be intermeshed with the spindle gear-wheel 21. 22 represents the lever for producing the eccentric throw. It is obvious that when these back gear-wheels are intermeshed, as shown in Fig. 1, for instance, the spindle is driven at a relatively lower rate of speed than the sleeve carrying the driving-pulley and with no belt strain and no friction on the spindle. In other words, the entire strains, as well as the entire friction, of the sleeve carrying the driving-pulley are sustained solely by the bearings 3 4, while all of the strains and the friction of the spindle are sustained solely by the bearings 2 5.

It will be noticed that this construction dispenses with the ordinary cone of driving-pulleys, although they may be employed without departing from the invention. We prefer the form shown, however. The driving-sleeve, with its single broad-faced pulley-wheel, is mounted in compact bearings, which are very close to each end of this driving-pulley as compared to the conventional type with the bearings at each end of the head-stock. It is obvious that with the conventional type of cone-pulley bearing on the spindle and the spindle journaled at each end of the head-stock the heavy upward pull of the belt is frequently midway between the opposite ends of the head-stock, having a tendency to spring the spindle. It is also obvious that as the belt is shifted to different pulleys the spindle is subjected to the belt strains at various points along its entire length. This causes unequal strains on the spindle as well as the two end bearings. In the preferred form of our invention there are no shifting belt strains on the driving-sleeve. Again, this driving-sleeve is made of just sufficient length to carry the driving-wheel and the back gearing, and it is journaled in independent bearings set relatively close together as compared to the bearings for the spindle. As a result the belt strains are directly sustained by the intermediate portion of the head-stock, and the frictional strain of the highly-speeded driving-sleeve is sustained by these two intermediate sets of bearings. The end bearings, carrying the spindle, are only subjected to the friction of the rotation of the spindle and the lifting strain imparted to the spindle by the action of the tool on the work clamped between centers. It is obvious that this construction must greatly increase the life of the head-stock, the life of the bearings, and the precision of the spindle. Of course it will be understood that only that portion of the spindle which lies within the sleeve need be of less diameter than the bore of the sleeve.

Having described our invention, we claim—

1. In combination with the head-stock of an engine-lathe, two sets of bearings in axial alinement, a driving-sleeve journaled in the intermediate bearings, a spindle of lesser diameter than the internal diameter of said sleeve, passing through said sleeve without substantial contact, and journaled at each end of the sleeve in the end bearings, means for directly clutching the driving-sleeve to the spindle, and means for back gearing from the sleeve to the spindle, substantially as described.

2. In an engine-lathe, a head-stock having independent bearings in line axially for the purpose of independently supporting a driving member and spindle, a driving member journaled in one of the bearings, a spindle journaled in the other, said spindle and driving member being supported by their respective bearings substantially free from frictional contact with each other, a clutch member between said spindle and driving member adapted to fix them to rotate together, means for throwing the clutch, back gearing from the driving member to the spindle, and means for throwing said back gear-wheels into or out of train, whereby when the said back gears are in commission, the spindle and driving member rotate substantially free from frictional contact with one another.

In testimony whereof we have hereunto set our hands.

WILLIAM LODGE.
NICHOLAS D. CHARD.

Witnesses:
OLIVER B. KAISER,
LUISE BECK.